United States Patent [19]

Lee, Jr. et al.

[11] 3,815,239

[45] June 11, 1974

[54] METHOD OF FILLING AND SEALING DEVELOPMENTAL PIT AND FISSURES

[76] Inventors: Henry L. Lee, Jr., 443 Orange Grove Cir., Pasadena, Calif. 91105; Jan Alexander Orlowski, 1304 Rubio St., Altadena, Calif. 91001; Alvin I. Kobashigawa, 1451 W. 162 St., Gardena, Calif. 90247

[22] Filed: Jan. 13, 1972

[21] Appl. No.: 217,672

[52] U.S. Cl............... 32/15, 117/47 R, 117/62.2, 117/DIG. 3
[51] Int. Cl.............................................. A61k 5/00
[58] Field of Search....... 117/DIG. 3, 62.2, 161 UZ, 117/161 UB, 47 R; 32/15

[56] References Cited
UNITED STATES PATENTS

| | | | |
|---|---|---|---|
| 2,406,454 | 8/1946 | Charlton et al. | 117/DIG. 3 |
| 2,684,305 | 7/1954 | Quinlivan | 117/DIG. 3 |
| 2,745,817 | 5/1956 | Logemann et al. | 32/15 |
| 2,758,106 | 8/1956 | Bredereck et al. | 32/15 |
| 2,779,751 | 1/1957 | Bredereck et al. | 32/15 |
| 3,473,949 | 11/1969 | Eldred et al. | 117/62.2 |
| 3,506,479 | 4/1970 | Breens et al. | 117/62.2 |
| 3,638,312 | 2/1972 | Szwarc et al. | 32/15 |
| 3,672,942 | 6/1972 | Neumann et al. | 117/62.2 |
| 3,730,947 | 5/1973 | Stoffey et al. | 32/15 |

*Primary Examiner*—William D. Martin
*Assistant Examiner*—M. Sofocleous
*Attorney, Agent, or Firm*—Irons, Sears & Santorelli

[57] ABSTRACT

Dental developmental pit and fissure sealant composition comprising component A composed essentially of a thermosetting resin of the formula:

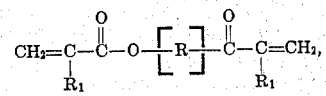

wherein $R_1$ is hydrogen or alkyl of one to four carbon atoms; and R is $(CH_2CH_2-O)_x$ wherein $x$ is an integer of 1 to 5, and an accelerator for said resin; and component B composed in one embodiment essentially of a solution of a peroxide catalyst for the resin of A, and in an alternative embodiment including additional resin of A.

The fissure sealant compositions disclosed have excellent surface tension characteristics, low viscosity, and good penetration ability.

The sealant compositions are applied stepwise by first applying a drop of either component to a cleaned and primed surface of a tooth to be sealed, allowing it to penetrate for 30 seconds, then applying a drop of the other component, allowing the components to remain in contact with each other for two minutes, and then removing any excess unpolymerized material.

In a preferred embodiment component A comprises diethyleneglycol dimethacrylate and N-bis(hydroxyethyl)-p-toluidine accelerator, and component B is comprised of diethyleneglycol dimethacrylate and benzoyl peroxide catalyst, the latter component being applied to the tooth first.

14 Claims, No Drawings

METHOD OF FILLING AND SEALING DEVELOPMENTAL PIT AND FISSURES

BACKGROUND OF THE INVENTION

1. Field of the Invention

This invention is related to the sealing of developmental pits and fissures in dental enamel with polymerizable thermosetting diacrylic resin compositions which are cured in the presence of an accelerator and peroxide catalyst.

2. Description of the Prior Art

The use of various diacrylic resins as binders for direct filling resin compositions in dentistry is known to the art. In addition, various aromatic diacrylic resins without filler have been employed for the direct filling and sealing of developmental pits and fissures in dental enamel with varying degrees of success. One of the primary drawbacks in the use of aromatic diacrylic resins in the sealing of developmental pits and fissures in dental enamel is their relatively high viscosity and failure to completely "flow in" to the pits and fissures to assure complete sealing and good adhesion. In addition, the prior art techniques previously employed required the dentist to mix together at least two components away from the surface of the tooth prior to applying the material to the surface of the tooth. Such procedure is rather time-consuming and awkward, and since mixing the components outside the mouth immediately initiates the process of polymerization, the flowability of the product applied to the tooth was thereby limited.

Various attempts to overcome these drawbacks have included the utilization of a U.V. sensitive catalyst-accelerator combination which is activated by exposure to U.V. light after the system is applied to the tooth. While there is some improvement in results over previous methods, it requires special U.V. equipment with its attendant costs and complicates the procedure for the dentist.

Previous applications of acrylate resins which were mixed with accelerator and catalyst outside the mouth also often resulted in the build-up of unwanted thickness of the sealing layer which led to uneven bite. This was caused by the start of set up of the material upon mixing and prior to contact with the surface of the tooth to be treated and accentuated by the high viscosities of previously used materials which did not "flow in" well.

Such build-up required the dentist to spend additional time to cut and sand away the unwanted material.

While glycol diacrylates such as ethyleneglycol dimethacrylate, diethyleneglycol dimethacrylate, and triethyleneglycol dimethacrylate, among others, have been previously employed as reactive diluents in acrylate resin compositions used in direct filling and fissure sealant dental compositions, they have not been utilized as the sole or primary monomer component.

SUMMARY OF THE INVENTION

According to the present invention, it has been found that a dental fissure sealant having greatly improved handling characteristics and excellent ability to completely fill and seal dental developmental pits and fissures is obtained with a composition comprising component A, consisting essentially of a thermosetting polymerizable resin of the formula:

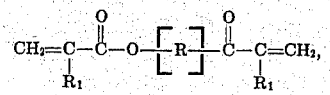

wherein $R_1$ is hydrogen or alkyl of one to four carbon atoms, preferably methyl, wherein $x$ is an integer of 1 to 5, preferably 2, and an accelerator for said resin; and component B, comprising a peroxide catalyst for the resin of component A. The preferred catalyst is benzoyl peroxide.

The foregoing specific type of diacrylates have excellent surface tension characteristics, low viscosity, and penetration ability.

Compounds falling within the scope of the foregoing formula are commercially available and/or are readily prepared using known teachings of the prior art.

In the above composition, component B may be comprised of a peroxide catalyst alone in solution, such as a saturated solution of benzoyl peroxide in diethyl ether. Alternately, component B may comprise a mixture of peroxide catalyst and an additional amount of the same resin as component A.

The foregoing composition may be applied to the tooth using the previous method of mixing the components outside the mouth and then quickly applying the mixture to the surface of the tooth to be treated.

While useful sealant coats are obtained that are equal or better than obtained with many prior sealant compositions, the results are limited by the difficulties involved with the method discussed above.

Greatly improved results are obtained when the new sealant composition of this invention is applied according to the method forming another aspect of the invention.

According to the present invention, in situ curing of the diacrylic resin or resin blend is accomplished by the two-step coating of the tooth surface. Thus, either component A or component B is first applied to the surface of the tooth and permitted to penetrate into the pits and fissures.

Thereafter the other component is applied over the first component on the surface of the tooth. The components mix together on the surface of the tooth and polymerize in situ on the surface of the tooth. After permitting the mixed composition to polymerize on the surface of the tooth, any excess unpolymerized material is merely wiped off the tooth.

For example, in the first step, the prepared surface of the tooth is coated with component B having the peroxide catalyst for the diacrylic resin employed. As indicated, the catalyst may be applied alone from a solution or with a mixture of a portion of the diacrylic resin. After a period of approximately 30 seconds to allow the peroxide component to penetrate the pits and fissures and to flow on the surface of the tooth, the second coating comprising the resin-accelerator mixture component A is applied. The two layers mix on the surface of the tooth, the mixture containing accelerator and resin fusing into the catalyzed layer causing curing of the resin which thoroughly penetrates into the developmental pits and fissures. The penetration of the fissure sealant composition of this invention is greatly enhanced since no reaction takes place until the two layers are mixed on the surface of the tooth.

The method of applying the sealant composition of the present invention also includes the reverse steps, that is, of first applying the resin layer containing the accelerator and thereafter applying the catalyst containing component B.

The preferred method of application, however, is the application of component B first wherein it is comprised of an equal amount of liquid resin with that in component A and catalyst sufficient for the total amount of resin in components A and B, and thereafter applying component A.

The present invention thus elminates any need for the mixing of a diacrylate resin blend on the part of the dentist just prior to application. This eliminates a critical step in the application of such sealants since when the resin is blended outside of the mouth, the polymerization starts immediately and often the degree of set up which takes place prior to application to the tooth surfaces prevents the obtaining of the proper degree of adhesion and also inhibits the flow of the resin mixture into the pits and fissures. In the present invention the first layer applied to the tooth surface is very fluid relative to previous compositions and thus the penetration into the developmental pits and fissures is very complete. An additional advantage obtained following the teaching of the present invention is that since the mixing of the catalyst and the accelerator portion of the resin mixture occurs in situ on the surface of the tooth, more highly catalyzed and accelerated systems may be employed, thus hastening the cure time and thereby shortening the time the patient is in the dental chair. As indicated above, in many previous methods an undesirable aspect was the unwanted build up of the thickness of the sealant layer which required grinding or sanding away of excess in order to restore the proper occlusal bite. In the present method, any unpolymerized resin is merely wiped off after the polymerization of the surface portion has taken place.

In the event a greater build up is desired, the foregoing stepwise application process may be repeated several times or the known method of mixing outside the mouth may be employed. In the latter case, the material is partially set up when applied to the tooth and as indicated above naturally tends to build up more, and not to adhere as well.

The method of the present invention is particularly useful in the sealing of developmental pits and fissures on the occlusal surface of the posterior dentition.

DESCRIPTION OF PREFERRED EMBODIMENTS

The specific diacrylic resins of the present invention have excellent adhesive characteristics to a properly prepared enamel.

It, of course, is understood that best adhesion is obtained with proper preparation of the tooth as is the case with previously known sealants. Thus, the surface of the tooth to be sealed is preferably first chemically cleansed, usually with an acid such as citric or phosphoric acid. We have found that a 50 to 85% solution of phosphoric acid is quite satisfactory. It serves as an etchant to remove plaque and oral debris as well as to condition the substrate to make it more receptive to the resinous sealant.

Greater adhesion is also obtained if a keying agent is applied. Known keying agents such as organofunctional silanes which contain at least one group functional with the unsaturation of the arcrylate portion of the resin molecule may be utilized. We have found that a particularly useful keying agent comprises a 5 percent solution of hydrolyzed gamma-methacryloxypropyltrimethoxysilane in diethyl ether.

The most preferred resin used in the resin system of this invention is diethyleneglycol dimethacrylate which, while unsuited for most general uses in dental filling materials such as direct fillings where strength is required to withstand occlusal stresses, it is particularly suited to the practice of this invention. It has a combination of properties highly desired in a dental fissure sealant. Thus, it has low viscosity to insure penetration into deep fissures, low surface tension such that it wets the surface of the tooth well promoting excellent bonding, low shrinkage compared to monoacrylates which in itself promotes good adhesion. The combination of low viscosity and low surface tension permits the two layers to admix on the tooth to a high degree when the second layer is dabbed on the first layer. The internal viscosity is such that the fusion of free radicals proceeds at an excellent rate to achieve cure within a clinically feasible time.

It is recommended that minor amounts of polymerization inhibitors and antioxidants be included in the resin composition. Thus, in order to inhibit unwanted polymerization during extended shelf storage, it is customary to include 60 – 110 ppm. hydroquinone. An example of an antioxidant employed is 2-tert-butyl-4-methylphenol in amounts of from .05 to 1.0 percent.

Any of the perioxide catalysts previously known to be useful with acrylate type resins may be employed; however, we prefer benzoyl peroxide as the catalyst of choice. The catalyst is generally employed in amounts ranging from 0.5 to 8 percent, preferably about 2 percent, by weight of the resin monomers present in both components.

In the case where a catalyst is applied alone from a solvent such as diethyl ether, it is usually applied from a substantially saturated solution so that the amount of catalyst remaining on the tooth after the solvent has dried is about 1 to 10 percent by weight of the resin monomer.

The amount of accelerator employed is adjusted to the particular working time desired. Polymerization times of about 2 minutes are preferred. Usually amounts from about 0.5 to 8 percent by weight of the monomer employed are utilized. The preferred amount is 2.5 percent. Any known suitable accelerators for acrylate resins may be employed; however, tertiary amine accelerators are preferred. Examples of suitable accelerators are p-toluene sulfinic acid, N,N-dimethyl-p-toluidine, and N-bis(hydroxyethyl)-p-toluidine. The preferred accelerator is N-bis(hydroxyethyl)-p-toluidine.

EXAMPLE 1

A first mixture comprising 12 grams of diethyleneglycol dimethacrylate, 60 ppm hydroquinone, 0.012 grams of 2-tert-butyl-4-methylphenol and 0.5 grams of anhydrous benzoyl peroxide and a second mixture comprising 12 grams of diethyleneglycol dimethacrylate, 60 ppm hydroquinone, and 0.6 grams of N-bis(hydroxythyl)-p-toluidine are prepared.

A human second molar is cleansed by wiping with a cotton applicator with a 50 percent solution of phosphoric acid which is permitted to remain on the surface of the tooth for approximately 20 seconds. The surface of the tooth is then rinsed thoroughly with water and dried completely with warm, oil free, dry compressed air. One drop of the first mixture containing the benzoyl peroxide catalyst is applied to the dried surface of the tooth with a cotton applicator. The first mixture is permitted to spread over the surface of the tooth and penetrates well into the pits and fissures. The first mixture remains on the tooth surface for a period of about 30 seconds after which a drop of the second mixture which contains the accelerator is applied to the surface of the tooth over the first mixture and permitted to remain in contact with the layer of the first mixture for approximately two minutes. During this period the resin polymerizes. At the end of the two minute period any unpolymerized material is easily removed by blotting with a clean cotton applicator.

The tooth is then sectioned through existing developmental pits and fissures and examination shows a thoroughly polymerized plastic material has completely filled and sealed the pits and fissures thereby protecting them against the ingress of solid environmental constituents.

EXAMPLE 2

The procedure of EXAMPLE 1 is repeated, but in this Example following the cleansing with phosphoric acid and drying of the tooth, the surface of the tooth to be treated is primed with 5 percent hydrolyzed gamma-methacryloxypropyltrimethoxysilane in diethyl ether. The priming solution is allowed to remain on the surface of the tooth for about two minutes before the application of the resinous components. Examination and testing indicate an increased tenacity of the layer due to the use of the primer.

EXAMPLE 3

The surface of a tooth is cleansed following the procedure described in EXAMPLE 1. To the cleansed and dried tooth, a 60 percent solution of benzoyl peroxide in diethyl ether is applied using a cotton applicator. The surface of the tooth is then dried with compressed air and a drop of the second mixture consisting of the N-bis(hydroxyethyl)-p-toluidine accelerator and resin described in EXAMPLE 1 is applied to the surface of the tooth with a cotton applicator, and flowed over the surface so as to penetrate into the cracks and fissures. After approximately two minutes, any remaining unpolymerized surface material is removed by blotting with a clean cotton applicator. As in EXAMPLE 1, the tooth is then sectioned and shows that the pits and fissures are completely filled and sealed.

EXAMPLE 4

The procedure of EXAMPLE 1 is repeated except that the mixture containing the N-bis(hydroxyethyl)-p-toluidine accelerator is applied after cleaning and drying of the tooth, allowed to remain on the tooth 30 seconds, and then the mixture containing the benzoyl peroxide catalyst is applied and permitted to remain in contact with the layer of resin containing the accelerator for two minutes. At the end of the two minute period any unpolymerized material is removed by blotting with a cotton applicator.

Because the developmental pit and fissure sealant compositions of this invention have excellent surface tension characteristics, low viscosity, and good penetration ability, and do not start to polymerize until both components thereof have been applied to the surface of the tooth, complete filling and sealing of pits and fissures is obtained with ease. The sealant film formed has excellent adhesive properties. The two-component system provides excellent shelf life and permits extended storage of the components even once the packages have been opened.

While the invention has been explained by detailed description of certain specific embodiments, it is understood that various modifications and subsitutions can be made in any of them within the scope of the appended claims which are intended to include equivalents of such embodiments.

What is claimed is:

1. A method of filling and sealing developmental pits and fissures in tooth surfaces which includes the steps of applying to the surface of a tooth a thermosetting resin composition consisting essentially of a compound of the formula:

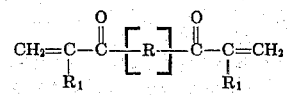

wherein $R_1$ is hydrogen or alkyl of 1 to 4 carbon atoms; and R is $(CH_2CH_2-O)_x$ wherein $x$ is an integer of 1 to 5, and an accelerator and peroxide catalyst for said compound, and permitting said resin composition to harden in situ.

2. A method as claimed in claim 1 wherein said compound is diethyleneglycol dimethacrylate.

3. A method of filling and sealing developmental pits and fissures in tooth surfaces which comprises applying to the surface of the tooth stepwise a composition comprising:

component A, consisting essentially of a thermosetting polymerizable resin of the formula:

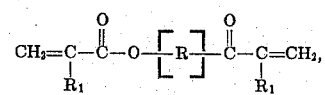

wherein $R_1$ is hydrogen or alkyl of one to four carbon atoms; and R is $(CH_2CH_2-O)_x$, wherein $x$ is an integer of 1 to 5, and an accelerator for said resin; and component B, comprising a peroxide catalyst for the resin of component A, the first step comprising applying a first one of said components A and B to the surface of the tooth said first one of said components penetrating said pits and fissures, the second step comprising applying the second of said components over the first on the surface of the tooth, and permitting said components to polymerize in situ on the tooth, and then removing any excess unpolymerized material from the tooth.

4. A method as claimed in claim 3 wherein component B comprises a peroxide catalyst and a resin of the formula:

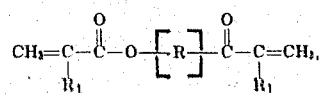

wherein $R_1$ is hydrogen or alkyl of one to four carbon atoms; and R is $(CH_2CH_2-O)_x$, wherein $x$ is an integer of 1 to 5.

5. A method as claimed in claim 4 wherein said resin of component A and B is diethyleneglycol dimethacrylate.

6. A method as claimed in claim 5, wherein said first one of said components A and B is component A and said second of said components is component B.

7. A method as claimed in claim 5, wherein said first one of said components A and B is component B and said second of said components is component A.

8. A method as claimed in claim 3 wherein said resin is diethyleneglycol dimethacrylate.

9. A method as claimed in claim 3 wherein the accelerator of component A is N-bis(hydroxyethyl)-p-toluidine and comprises from 0.5 to 8 percent by weight of the total amount of diethyleneglycol dimethacrylate in said composition, and the peroxide catalyst of component B is benzoyl peroxide and comprises from 0.5 to 8.0% by weight of the total amount of diethyleneglycol dimethacrylate in said composition.

10. A method as claimed in claim 9 further comprising first cleaning said tooth with a phosphoric acid solution, drying said tooth, priming said tooth with a hydrolyzed gamma-methacryloxypropyltrimethoxysilane, and again drying the tooth prior to application of said components A and B.

11. A method as claimed in claim 3 wherein component A is applied to the surface of the tooth first, and then component B is applied over component A on the surface of the tooth.

12. A method as claimed in claim 11 further comprising first cleaning said tooth with a phosphoric acid solution, drying said tooth, priming said tooth with a hydrolyzed gamma-methacryloxypropyltrimethoxysilane, and again drying the tooth prior to application of said components A and B.

13. A method as claimed in claim 3, wherein said first one of said components A and B is component A and said second of said components is component B.

14. A method as claimed in claim 3, wherein component B consists essentially of a concentrated solution of benzoyl peroxide in an organic solvent and component A consists essentially of diethyleneglycol dimethacrylate and from 0.5 to 8 percent by wt. of the diethyleneglycol dimethacrylate of N-bis (hydroxyethyl)-p-toluidine, said process comprising applying component B to the tooth first, drying component B, and then applying component A over the dried component B on the surface of the tooth.

* * * * *